UNITED STATES PATENT OFFICE.

WILLIAM J. L. HOLLIS, OF LONDON, ENGLAND.

LUBRICANT.

SPECIFICATION forming part of Letters Patent No. 259,760, dated June 20, 1882.

Application filed January 27, 1882. (No specimens.)

*To all whom it may concern:*

Be it known that I, WILLIAM JAMES LEOPOLD HOLLIS, a subject of the Queen of Great Britain, residing at London, England, have invented new and useful Improvements in Lubricants, of which the following is a specification.

This invention relates to the manufacture of improved lubricants.

In carrying out my invention I take about seventy parts, by weight, of tallow (preferably Russian tallow) and melt the same in a steam-jacketed pan with water; or I otherwise wash or purify it. The tallow is then strained, and while still in a liquid state I add to it about three and one-quarter parts of castor-oil and about ten and one-quarter parts of either rape, olive, ground-nut, or cotton-seed oil and about three and one-quarter parts of mineral oil, and mix the whole well together. I then take about seven and one-quarter parts of common soda, to which I add about one and one-quarter part of caustic potash, about two and one-half parts of silicate of soda, and about two and one-quarter parts of water, and after mixing and straining these ingredients I add the same to the aforesaid mixture of tallow and oil and thoroughly mix the whole together, either by passing it through rolls or otherwise.

For a more fluid lubricant the tallow, common soda, and caustic potash are omitted and the proportion of water is increased, a small quantity of caustic soda being employed in place of the common soda. The whole of the ingredients are well mixed together to obtain the required fluidity.

Although I have given the proportions which I have found to answer well in practice, it will be understood that these proportions may be somewhat varied.

Having thus described my invention, I wish it to be understood that what I claim is—

The improved lubricant described, consisting of a mixture of castor-oil with one of the vegetable oils described, and with mineral oil, and with tallow, if desired, in substantially the proportions named, to which is added another mixture composed of soda, silicate of soda, and water, and of caustic potash, if desired, in substantially the proportions named, the two mixtures being intermixed, as set forth.

W. J. L. HOLLIS.

Witnesses:
A. ALBUTT,
F. PRICE.